United States Patent [19]

Krauss

[11] Patent Number: 4,981,282

[45] Date of Patent: Jan. 1, 1991

[54] MAGNETICALLY ACTUATABLE VALVE

[75] Inventor: Rudolf Krauss, Stuttgart, Fed. Rep. of Germany

[73] Assignee: Robert Bosch GmbH, Stuttgart, Fed. Rep. of Germany

[21] Appl. No.: 483,847

[22] Filed: Feb. 23, 1990

[30] Foreign Application Priority Data

May 20, 1989 [DE] Fed. Rep. of Germany ....... 3916459

[51] Int. Cl.[5] ....................... F16K 25/00; F16K 31/08; F02M 51/06

[52] U.S. Cl. ....................................... 251/86; 239/585; 251/129.15; 251/65; 335/262; 335/280

[58] Field of Search ............. 239/585; 251/86, 129.14, 251/129.15, 65, 129.16, 129.18; 335/262, 263, 277, 280, 302

[56] References Cited

U.S. PATENT DOCUMENTS

| | | | |
|---|---|---|---|
| 2,828,936 | 4/1958 | Hales | 251/129.14 |
| 3,628,767 | 12/1971 | Lombard | 251/129.14 |
| 3,727,390 | 3/1973 | Jackson | 239/585 |
| 4,320,781 | 3/1982 | Bouvet et al. | 251/129.14 |
| 4,390,130 | 6/1983 | Linssen et al. | 251/129.14 |
| 4,481,699 | 11/1984 | Knapp et al. | 251/129.14 |
| 4,597,558 | 7/1986 | Hafner et al. | 251/129.15 |
| 4,655,396 | 4/1987 | Taxon et al. | 251/129.16 |
| 4,756,331 | 7/1988 | Stegmaier | 251/129.15 |
| 4,807,846 | 2/1989 | Greiner et al. | 251/65 |

FOREIGN PATENT DOCUMENTS

| | | | |
|---|---|---|---|
| 0006769 | 11/1981 | European Pat. Off. . | |
| 2541033 | 3/1977 | Fed. Rep. of Germany | 251/129.14 |

*Primary Examiner*—George L. Walton

*Attorney, Agent, or Firm*—Edwin E. Greigg

[57] ABSTRACT

In known injection valves having a spherical valve closing member, it is difficult to center the valves. In the novel injection valve, self-centering is precisely achieved. In a valve having a spherical valve closing member on which a restoring spring is supported and which is located facing the end of the core of an electromagnet, it is proposed that a centering ring of soft magnetic material be disposed between the spherical valve closing member and the core end face. The injection valve is particularly well suited for fuel injection systems in internal combustion engines.

4 Claims, 2 Drawing Sheets

MAGNETICALLY ACTUATABLE VALVE

BACKGROUND OF THE INVENTION

The invention is based on an electromagnetically actuatable valve as defined hereinafter.

In known magnetically actuatable valves, in which the valve closing member is embodied by a ball on which either a connecting tube or a restoring spring is supported directly, it is difficult to center the valve closing member, particularly in the operating state of the valve, whenever the valve closing member is raised from the valve seat, because at that time the valve closing member has practically a three-dimensional freedom of motion and therefore easily gets off-center, which in turn affects the delivery of fuel to the valve opening.

OBJECT AND SUMMARY OF THE INVENTION

The object of the invention is to provide a means for centering the valve closing member, in the above-described type of electromagnetically actuatable valve, that is inexpensive to produce and can be disposed in the valve yet nevertheless functions reliably. The electromagnetically actuatable valve according to the invention as defined herein has the advantage that the centering device can be shaped separately, adheres to the core, yet can be radially displaced, thus producing self-centering with respect to both the valve seat and the valve guide; in other words, the centering device can be disposed very easily in the valve and need merely be placed on the end of the core.

Because the centering device has a nonmagnetic layer on the side oriented toward the valve closing member, the layer thickness defines the remanent air gap and simultaneously forms the stop. That is, a position-stabilizing diaphragm spring is no longer necessary, so the spring force of the spring resting on the valve closing member can be reduced. The valve closing member also simultaneously forms both the armature and the stroke stop, so that the valve closing member can be manufactured at favorable cost.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
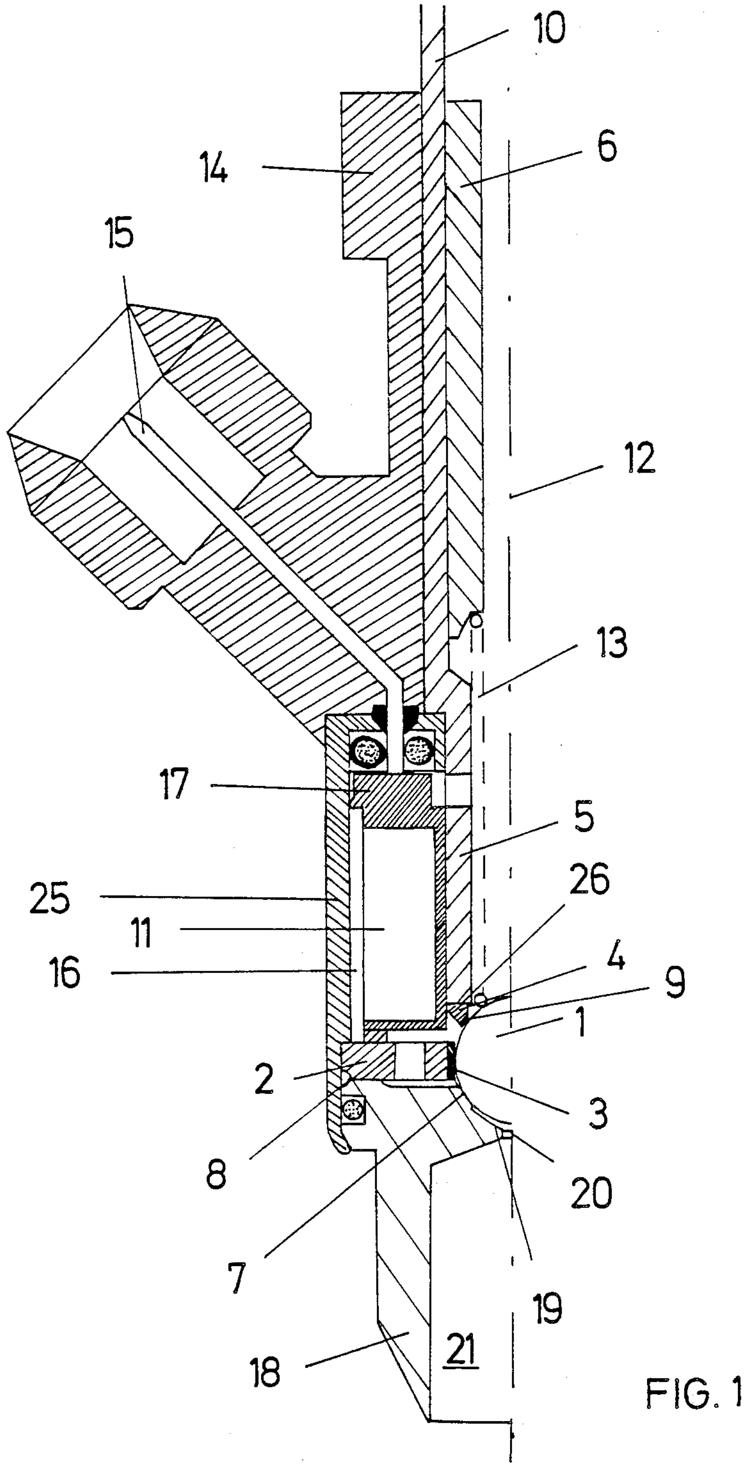
FIG. 1 shows an electromagnetically actuatable valve having the centering device according to the invention.

The electromagnetically actuated valve shown by way of example in FIG. 1, in the form of an injection valve for fuel in a fuel injection system of a mixture-compressing internal combustion engine with externally supplied ignition has a tubular metal connection piece 10 of ferromagnetic material, the lower part 5 of which protrudes as a core into a magnet coil 11. Located inside the connection piece 10 is an adjusting tube 6, on the lower end of which one end of a restoring spring 13 is supported that rests with its other end on a spherical valve closing member 1. This valve closing member I in the form of a ball is of soft magnetic material and is made largely wear-resistant by means of a suitable surface (chromium/nickel or nitride layer). In the closed state of the valve, the ball 1 rests on a valve seat 7 which is complemental to the ball 1 and seals with a small angle; that is, there is a small seat angle difference as will be best understood by reference to the drawing.

The magnetic circuit of the magnetic coil 11, core 5 and ball 1 is closed via a soft iron disk 2, which is located approximately on the great circle of the ball 1 and horizontal to the longitudinal axis 12 of the valve. At the same time this soft iron disk 2 is used for stroke adjustment by means of dimensional graduation. The inside diameter of this soft iron disk 2 optionally assumes guide functions, and for that purpose the inside diameter has a layer 3 of nonmagnetic material. Centering between the valve seat 7 and the soft iron disk 2 is possible by tolerance specification or by spot welds 8 on the outside diameter of the soft iron disk 2, after centering with larger balls 1.

At least part of the connection piece 10 and part of the magnet coil 11 are surrounded over their entire axial length by a plastic jacket 14, which can be made by lining them or extrusion coating them with plastic. An electric connection plug 15, by way of which the electrical contacting of the magnet coil 11 and thus its excitation are effected, is formed onto the plastic jacket 14. The magnet coil 11 is inserted into a coil chamber 16 and is held in a valve housing 25 by means of a spacer disk 17 via bearing points.

On its lower end, the valve housing 25 holds a valve seat body 18, which carries the aforementioned valve seat 7. Adjoining this valve seat 7 is a collecting chamber 19, beginning with which in the valve seat body 18, at least one injection port 20 for the emergence of the fuel is provided. This injection port 20 may be adjoined by a preparation chamber 21. Fuel preparation with one injection port 20 produces a cordlike or in other words straight stream; instead, an injection stream in the form of a hollow cone is obtained by using a plurality of injection ports. It is understood that it is also possible, with larger balls, to provide means on the surface of the ball 1 which form a seat in the ball for the lower extremity of the spring 13.

Accordingly, those skilled in the art will realize that it is desirable to keep the mass from moving the smallest degree possible. The means on the surface of the ball which engage the downwardly extending spring terminus can comprise upwardly projecting shoulders, an annular recess or any other suitable means which can fix the spring relative to the ball surface.

Figure 2:
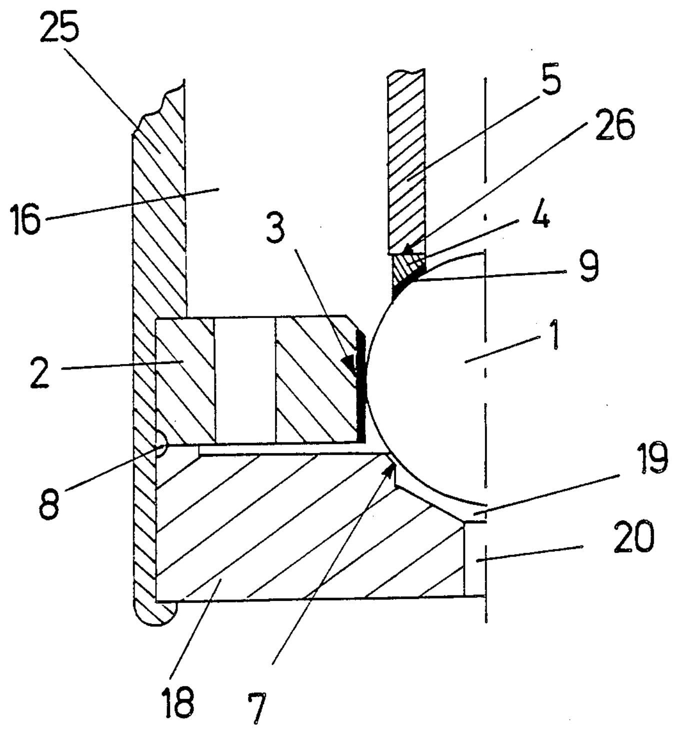
FIG. 2 shows a detail of the novel valve on a larger scale.

The features of the invention are shown on a larger scale in FIG. 2. It is seen that the ball 1 here is assigned a valve seat 7 on the valve seat body 18, and the soft iron disk 2 with its layer 3 of non-magnetizable material is positioned laterally of the ball 1. For the sake of clarity, the magnet coil has not been shown in the coil chamber 16. The core 5 comes to a end above the ball 1, and during operation a centering ring 4 of magnetizable material is adapted to adhere to the core; this ring 4 can be displaced radially relative to the core end face 26. On the side oriented toward the ball, which is embodied as curved or conically to fit the ball 1, the centering ring 4 has a layer 9 of nonmagnetizable material. It will be readily appreciated that during valve operation, the ball 1 provides for self-centering of the centering ring 4 both with respect to the valve seat 7 and to the soft iron disk 2 which serves as a guide.

The armature, valve closing member and stroke stop are made up of a single element, namely the ball 1, which is easy to manufacture. Only small masses need to be moved, so that the closing time of the valve is quite short, and the structural size can also be kept small. Compared with flat armature constructions, there is no tilting motion; as a result of the invention, a very advantageous electromagnetically actuated valve with self centering is created.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electromagnetically actuated valve, in particular a fuel valve for fuel injection systems of mixture-compressing internal combustion engines with externally supplied ignition, comprising a valve closing member (1) in the form of a sphere which simultaneously serves as an armature, a restoring spring (13) having a terminus, a magnetic coil (11) adapted to surround a core (5), said core (5) has a core end face (26), a separate centering ring (4) of soft magnetic material disposed between said core end face (26) and said valve closing member, said centering ring (4) rests on said core end face (26) of the core (5) and is displaceable radially relative to said core end face (26) and said valve closing member, whereby said centering ring (4) always centers said valve closing member when said valve closing member is moved to an open position to prevent a three-dimensional freedom of motion of said valve closing member in order to provide a uniform delivery of fuel.

2. The valve as defined by claim 1, in which said centering ring (4) has a non-magnetic layer (9) on the side oriented toward the valve closing member (1).

3. The valve as defined by claim 2, in which the non-magnetic layer (9) includes a zone which is formed complemental the valve closing member (1).

4. The valve as defined by claim 1, in which the spherical valve closing member (1) further includes means adapted to provide a support area for the terminus of said spring (13).

* * * * *